United States Patent [19]

Lovrenich

[11] Patent Number: 5,121,331
[45] Date of Patent: Jun. 9, 1992

[54] METHOD AND APPARATUS FOR TRACKING A WORKPIECE THROUGH A MULTI-STATION MACHINE

[75] Inventor: Rodger T. Lovrenich, Santa Teresa, N. Mex.

[73] Assignee: El Paso Technologies, El Paso, Tex.

[21] Appl. No.: 595,785

[22] Filed: Oct. 9, 1990

Related U.S. Application Data

[63] Continuation of Ser. No. 248,772, Sep. 23, 1988, abandoned.

[51] Int. Cl.[5] .................................................. G06F 15/46
[52] U.S. Cl. ........................................ 364/468; 235/375;
364/474.11; 364/478
[58] Field of Search .................. 364/468, 478, 474.11,
364/131-135; 235/375, 376, 383, 385; 29/568

[56] References Cited

U.S. PATENT DOCUMENTS

| | | | |
|---|---|---|---|
| Re. 31,247 | 5/1983 | Johnstone | 364/474.11 |
| 3,576,540 | 4/1971 | Fair et al. | 364/474.11 |
| 3,765,763 | 10/1973 | Nygaard | 355/100 |
| 4,306,292 | 12/1981 | Head, III | 364/468 |
| 4,309,600 | 1/1982 | Perry et al. | 364/468 X |
| 4,314,342 | 2/1982 | McNeir | 364/468 |
| 4,472,783 | 9/1984 | Johnstone et al. | 364/468 X |
| 4,473,883 | 9/1984 | Yoshida et al. | 364/468 |
| 4,509,123 | 4/1985 | Vereen | 364/300 |
| 4,564,102 | 1/1986 | Mori et al. | 198/341 |
| 4,564,913 | 1/1986 | Yomogida et al. | 364/468 X |
| 4,646,245 | 2/1987 | Prodel et al. | 364/468 |
| 4,654,512 | 3/1987 | Gardosi | 364/468 X |
| 4,669,047 | 5/1987 | Chucta | 364/468 |
| 4,698,629 | 10/1987 | Mori et al. | 340/825.05 |
| 4,718,025 | 1/1988 | Minor et al. | 364/550 |
| 4,759,123 | 7/1988 | Ohta et al. | 364/468 X |
| 4,821,198 | 4/1989 | Takeuchi et al. | 364/468 |
| 4,829,445 | 5/1989 | Burney | 364/478 |
| 4,835,730 | 5/1989 | Shimano et al. | 364/900 |
| 4,888,692 | 12/1989 | Gupta et al. | 364/402 |
| 4,974,166 | 11/1990 | Maney et al. | 364/468 X |

OTHER PUBLICATIONS

Baba et al., "Development of a Process Computer Control System for a New Billet Mill", *IEEE*, 1985, pp. 557–562.

*Primary Examiner*—Joseph Ruggiero
*Attorney, Agent, or Firm*—Donald J. Lisa

[57] ABSTRACT

A transfer or production line utilizing a plurality of stations is described which has a computer at each station. Each computer has a part processing record for all workpieces currently in the line. As the workpiece transfers down the line, a part position index, contained in each of the station computers, is updated to indicate which part processing record is associated with the workpiece at each station. The information in the part processing record is utilized by the station computer to inhibit the station from cycling if the record indicates that a prerequisite had not been completed.

22 Claims, 10 Drawing Sheets

| MECHANISM ZONE TABLE | MECHANISM NAME: \_\_\_\_\_\_\_\_\_\_ STATION NAME: 5L |

| ZONE NUMBERS (REF) | I/O TYPE<br>I = PHYSICAL INPUT<br>C = COMMAND INPUT<br>O = PHYSICAL OUTPUT<br>R = REQUEST OUTPUT<br>M = MOS (MACHINE OPERATING SYSTEM) OUTPUTS<br><br>ZONE NAMES ① | I/O NAMES ②<br>ERROR RESET | ADVANCE SLIDE | RETURN SLIDE |
|---|---|---|---|---|
| | | C | C | C |
| 1 | INITIALIZING | X | X | X |
| 2 | RETURNED | X | O | X |
| 3 | ADVANCING FROM RETURNED | X | 1 | X |
| 4 | ADVANCING BETWEEN | X | 1 | X |
| 5 | ADVANCED | X | X | O |
| 6 | RETURNING FROM ADVANCED | X | X | 1 |
| 7 | RETURNING BETWEEN | X | X | 1 |
| 8 | STOPPED BETWEEN | X | O | O |
| 9 | COASTING TO STOP | X | X | X |
| 10 | ERROR DEFAULT ③ | O | X | X |

LEGEND:  ⓪ MUST BE OFF   ① MUST BE ON

METHOD AND APPARATUS FOR TRACKING A WORKPIECE THROUGH A MULTI-STATION MACHINE

This application is a Continuation of Ser. No. 07/248,772, filed Jul. 19, 1990, abandoned.

BACKGROUND OF THE INVENTION

The present invention relates, in general, to a method and apparatus for producing a workpiece and, more specifically, to a method and apparatus that tracks and maintains a part processing record during the production of the workpiece.

An example that will be used in describing the present invention is that of an automotive industry production line. However, it should be noted that the present invention is not limited to such production lines.

In general, production lines, or systems, are a combination of machines, or processes. A machine is composed of one or more stations with each station having one or more mechanisms. These mechanisms can additionally be broken down into their constituent elements.

Errors in processing and damage to workpieces and stations occur from a failure of the individual stations to be informed of the part processing record of the workpiece. As an example, the manufacture of automotive engine blocks will be used. If a hole is drilled in the block at one station and then the hole is tapped at another station, a great deal of damage can be done to the tapping station if the hole was not drilled, or drilled improperly, at the drilling station. Additionally, the block may be damaged in such an instance rendering it unrepairable.

In an effort to avoid these types of problems, individual stations have been equipped with probes, such as a full depth probe in this example, that will check the block before the tapping station to see if the workpiece is in condition to be tapped. While this inspection saves damage to the stations, and possibly the blocks, it has increased the operating time of the station to perform this check. This additional time in processing can increase the cost of a completed product significantly. Further, these probes increase the cost of the station and insert another mechanism that may malfunction.

Another problem that exists is that of having the same station performing multiple cycles on the same workpiece. This error can occur when several stations do not operate with equal cycle times. For instance, it may take the drilling station three times the amount of time to drill a hole as it does the tapping station to tap a hole. When the order comes in to execute, or cycle, the tapping station will tap the hole, pull back and still see the command to cycle. Seeing this command, the tapping station will again attempt to tap the hole. Logical latches are used to avoid this problem by allowing each station to cycle only once. The transfer of parts then acts to release the logical latch.

In addition, it is difficult, if at all possible, in prior art production lines to insert a partially completed workpiece at the beginning of a line and have only the functions performed on the workpiece that are required. Further, it may be desirable to insert a partially finished workpiece in the middle of a production line. This insertion would also be difficult as the system would have no way of knowing what operations had and had not been performed.

One patent in the area of manufacturing is U.S. Pat. No. 4,509,123 issued to Vereen. This patent describes an automated tracking process for manufacturing and inventory. More specifically, the patent describes a process for manufacturing garments by placing a tag, or similar item, having a machine readable code on the bundles. These tags are scanned at each work place to register the operator, machine, and time the bundle was completed at that station. However, there is no communication from the system storing the information back to the stations. As a result, there is no way to inform a downstream operator that an upstream operator, or station, has or has not performed its work on the bundle. In other words, there is no way to inhibit the present operator from working on the bundle based on some previous operators action.

Another patent is U.S. Pat. No. 3,765,763 issued to Nygaard. This patent describes an automatic slice (semiconductor wafer) processor. In this patent, a machine readable code is etched on a portion of the wafer. At various points in the production line, the codes are read to insure that the wafers stay in order during processing. However, there is no method to stop (inhibit) the downstream processing of a wafer if an upstream operation was not performed correctly. Further, it is not possible to start a wafer in mid-stream on the production line.

Accordingly, it is an object of the present invention to provide a method and apparatus of processing a workpiece that overcomes the above deficiencies.

A further object of the present invention is to provide a method and apparatus of monitoring a part processing record during the production of the workpiece.

Another object of the present invention is to provide a method and apparatus of processing a workpiece in which operation at a work station can be inhibited by a part processing record of the workpiece.

Still another object of the present invention is to provide a method and apparatus of processing a workpiece in which a current part processing record of all workpieces currently in process is maintained at each work station.

Yet another object of the present invention is to provide a method and apparatus of processing a workpiece which is more economical to utilize.

SUMMARY OF THE INVENTION

A particular embodiment of the present invention provides a production line, or system, having a monitoring, or orchestrator, computer and a plurality of station computers, one at each work station. As a workpiece enters a station, an address is identified with the workpiece. The computer will direct the work station to perform the work on the workpiece unless inhibited by an inhibit such as the part processing record which is stored in the memory address identified with the workpiece. This inhibit occurs if some data associated with the workpiece, such as some prerequisite work, directs it to inhibit.

DETAILED DESCRIPTION OF THE DRAWINGS

Figure 1:
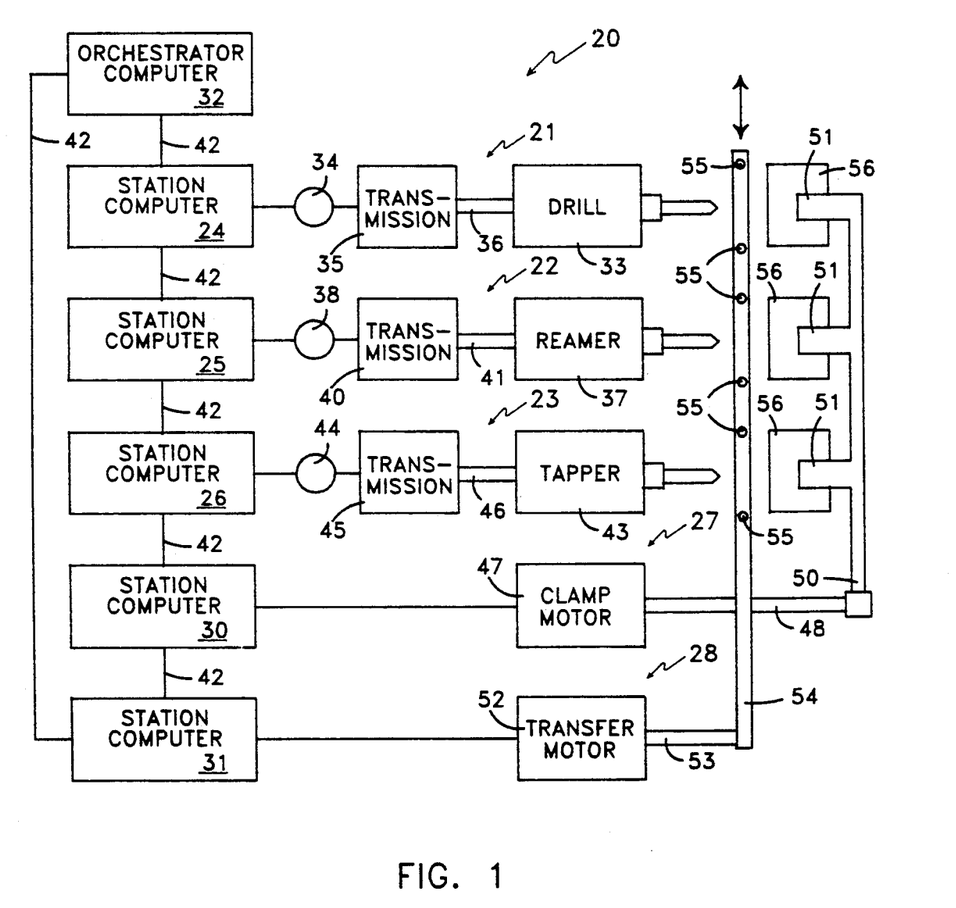
FIG. 1 is a block diagram of a production line illustrating three work stations.

Referring initially to FIG. 1, a block diagram of a production system, generally designated 20, is illustrated. Production system 20 consists of three work stations 21-23, having station computers 24-26, respectively. System 20 also comprises a clamp station 27 and a transfer station 28 each having a station computer 30 and 31, respectively. Station computers 24-26, 30 and 31 are monitored and controlled by an orchestrator computer 32. Communication among station computers 24-26, 30 and 31 and orchestrator 32 occurs over a communication loop 42. Communication loop 42 is preferably an optical loop.

Station computer 24 operates a drill 33 through a stepper motor 34 and a transmission 35. Transmission 35 is coupled to drill 33 through a shaft 36. Station computer 25 operates reamer 37 through a stepper motor 38 and a transmission 40. Transmission 40 is coupled to reamer 37 through a shaft 41. Station computer 26 operates a tapper 43 through a stepper motor 44 and a transmission 45. Transmission 45 is coupled to tapper 43 through a shaft 46.

Station computer 30 operates a clamp motor 47 which, through a shaft 48, operates a clamp bar 50 and a plurality of clamps 51. Station computer 31 operates transfer motor 52 which, through a shaft 53, operates a transfer bar 54. Transfer bar 54 having a plurality of guides 55 disposed thereon.

In operation, system 20 processes through the steps of: transferring a workpiece 56, clamping workpiece 56, working on workpiece 56 (cycling the station), and unclamping workpiece 56. In FIG. 1, transfer guides 55 are withdrawn from and clamps 51 are in contact with workpieces 56. This position indicates that stations 21-23 are preparing to cycle or have just completed cycling.

For a more detailed description of system 20, reference is made to U.S. Pat. No. 4,858,102 issued Aug. 15, 1989 to Rodger T. Lovrenich.

Figure 2:
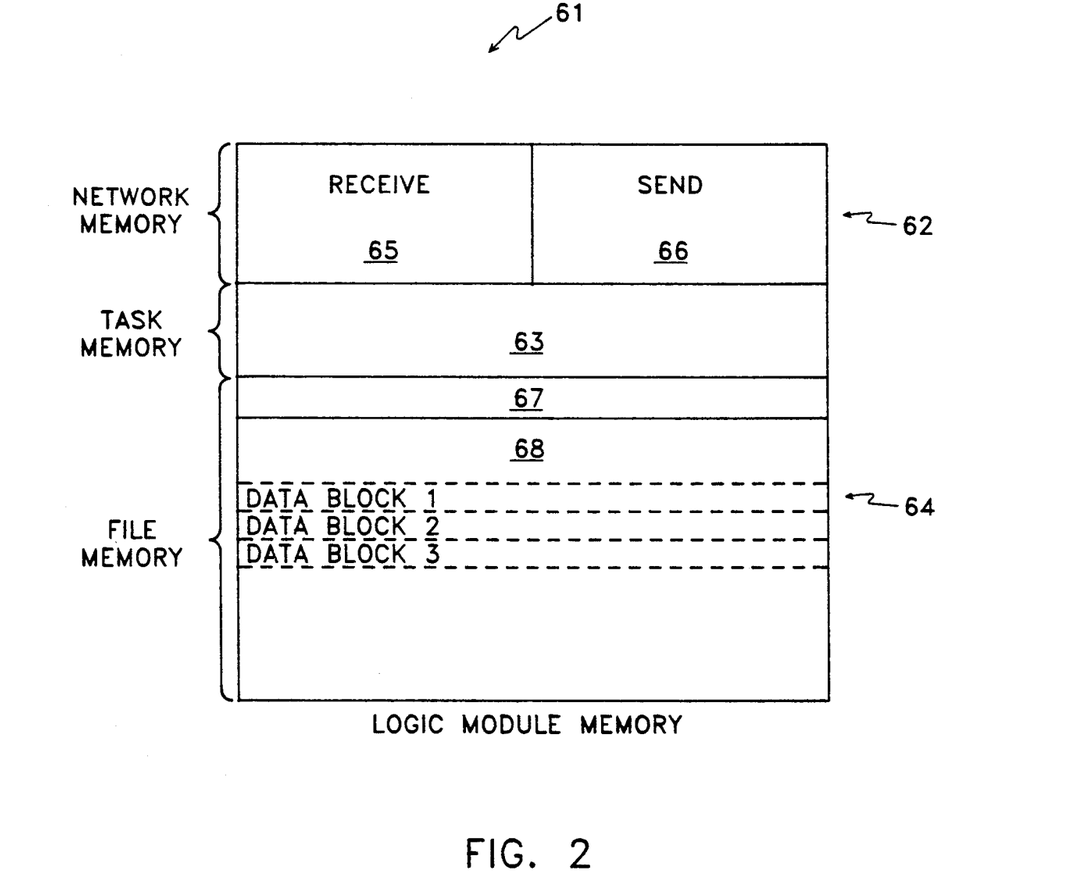
FIG. 2 is a block diagram of a logic module memory utilized by system of FIG. 1.

Referring now to FIG. 2, a block diagram of a logic module memory map, generally designated 61 is illustrated. It should be noted that logic module memory 61 is the same for all station computers 24-26, 30 and 31 and orchestrator 32; but that it is not the entire memory at those computers. Further, the information contained in logic module memory 62 is relatively the same at each location, except for the real time updates which continually occur. Any changes in the memory will be updated according to a sequence described later in this specification.

Logic module memory 61 is divided into several areas: a network memory 62, a task memory 63, and file memory 64. Network memory 62 is further divided into a receive portion 65 and a send portion 66. File memory 64 is further divided into a header 67 and a body 68. It is in body 68 where the part processing records for workpieces 56 are maintained. Header 67 contains the index to body 68 which indicates what address in body 68 contains the part processing record of which workpiece 56.

Referring now to FIGS. 3A-3F, a block diagram of a transfer line, generally designated 70 is illustrated. Transfer line 70 contains two work stations 71 and 72. Work piece 73 is awaiting processing through line 70. Prior to operating line 70, the information contained in body 68 of file memory 64 is as set forth in Table 1.

TABLE 1

DATA BLOCKS

| DATA BLOCK 1 PROCESS 1: 0 PROCESS 2: 0 | PART XX |
|---|---|
| DATA BLOCK 2 PROCESS 1: 0 PROCESS 2: 0 | PART XX |
| DATA BLOCK 3 PROCESS 1: 0 PROCESS 2: 0 | PART XX |

Figure 3A:
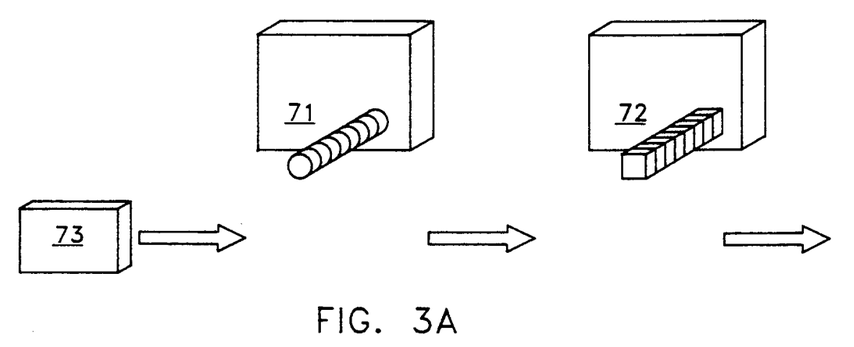
FIGS. 3A-3F are block diagrams of a flow of workpieces through a production line.

Since there are no parts currently in process, none of the data blocks indicate the completion of any processing. As illustrated, there will generally be one more data block than there are stations. However, there may be inactive station locations that do not require a data block or stations that perform more than one function requiring more than one data block.

Header 67 of file memory 64 contains an index, by memory address, of which data block, or part process record, is associated with a particular station containing that part, or workpiece. Initially, this index will appear similar to the index of Table 2.

TABLE 2

PART POSITION INDEX

| DATA BLOCK 1 | = | STATION X |
|---|---|---|
| DATA BLOCK 2 | = | STATION 1 |
| DATA BLOCK 3 | = | STATION 2 |

Table 2 is just one example of an initial part process index. The system can be programmed to commence at any initial index. In this index the workpiece associated with data block 1 is in station X, this is a nonexistent station whose use will become evident in the following discussion. The workpiece associated with data block 2 is in station 1 and the workpiece associated with data block 3 is in station 2.

Figure 3B:
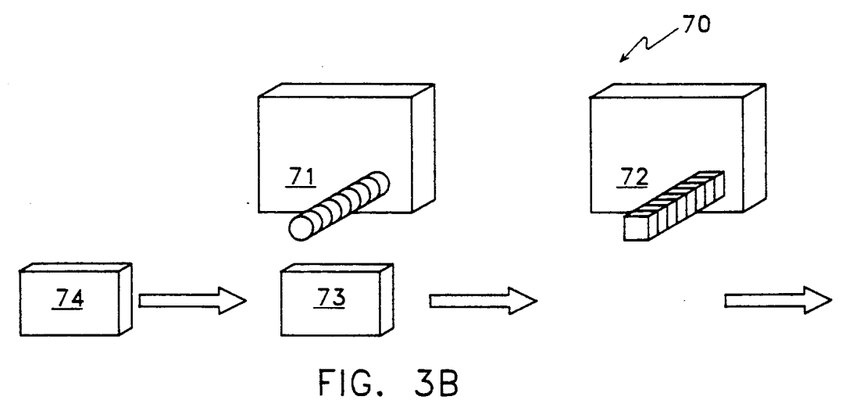

Once everything has been initialized in the system, a transfer station, such as station 28, FIG. 1, will index the workpieces. Now workpiece 73 is presented to station 71 and workpiece 74 is moved into position to enter line 70, as illustrated in FIG. 3B. When this movement occurs, an orchestrator, which may be the transfer station in this example, will send out the transfer order of Table 3 directing the part position index to be modified.

TABLE 3

PART TRANSFER ORDER

| FROM STATION X | TO STATION 1 |
|---|---|
| FROM STATION 1 | TO STATION 2 |
| FROM STATION 2 | TO STATION X |

This results in the part position index of Table 4 being generated.

TABLE 4

PART POSITION INDEX

| DATA BLOCK 1 | = | STATION 1 |
|---|---|---|
| DATA BLOCK 2 | = | STATION 2 |
| DATA BLOCK 3 | = | STATION X |

The data in the data blocks at this time is shown in Table 5.

TABLE 5

DATA BLOCKS

| DATA BLOCK 1 PROCESS 1: 0 PROCESS 2: 0 | PART 73 |
|---|---|
| DATA BLOCK 2 PROCESS 1: 0 PROCESS 2: 0 | PART XX |
| DATA BLOCK 3 PROCESS 1: 0 PROCESS 2: 0 | PART XX |

Figure 3C:
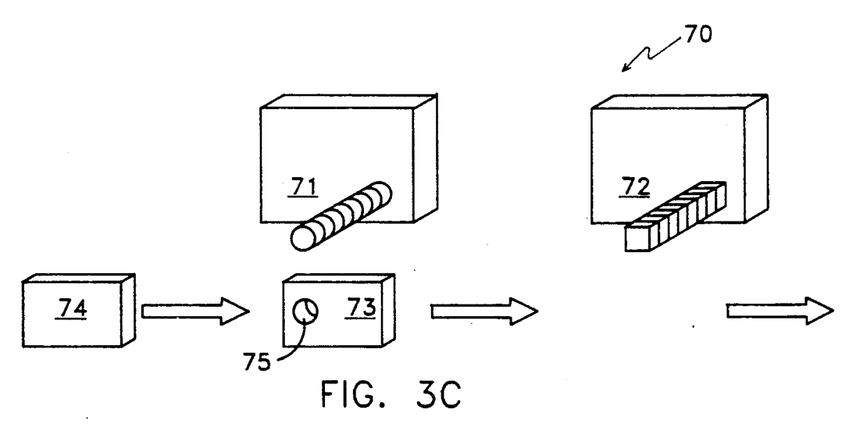

The next step is to cycle the station causing station 71 to drill hole 75 in workpiece 73, as shown in FIG. 3C. When station 71 has cycled, the data blocks are updated by the stations and distributed throughout the line as will be discussed below. The data blocks now appear as set forth in Table 6.

TABLE 6

DATA BLOCKS

| DATA BLOCK 1 PROCESS 1: 1 PROCESS 2: 0 | PART 73 |
|---|---|
| DATA BLOCK 2 PROCESS 1: 0 PROCESS 2: 0 | PART XX |
| DATA BLOCK 3 PROCESS 1: 0 PROCESS 2: 0 | PART XX |

Figure 3D:
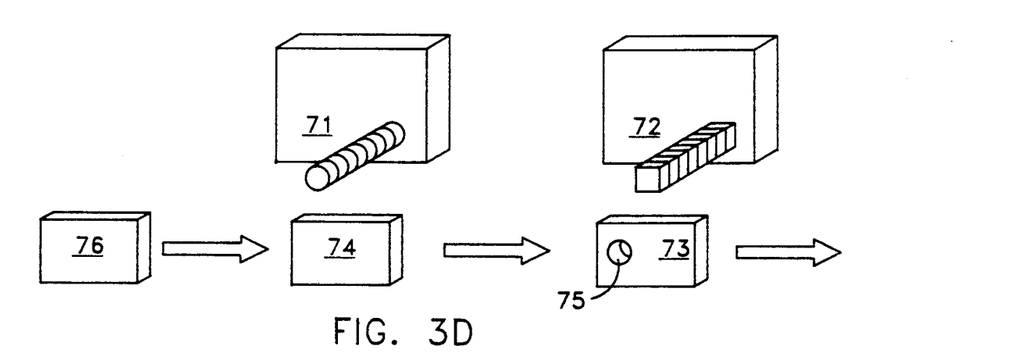

The above process is then repeated by indexing workpiece 73 and 74 forward, FIG. 3D. During this transfer step, the index is again updated according to the part transfer order of Table 3 which provides the index of Table 7.

TABLE 7

PART POSITION INDEX

| DATA BLOCK 1 | = | STATION 2 |
|---|---|---|
| DATA BLOCK 2 | = | STATION X |
| DATA BLOCK 3 | = | STATION 1 |

Now, the part processing record for workpiece 73 at station 2 is in data block 1; the record of workpiece 74 at station 1 is in data block 3; and the record of the workpiece at station X is in data block 2, station X being the nonexistent station.

At this point, the data blocks remain as they appeared in Table 6. The stations are again cycled drilling hole 77 in workpiece 73 and hole 78 in workpiece 74, FIG. 3E. The data blocks are then updated as in Table 8.

TABLE 8

DATA BLOCKS

| DATA BLOCK 1 PROCESS 1: 1 PROCESS 2: 1 | PART 73 |
|---|---|
| DATA BLOCK 2 PROCESS 1: 0 PROCESS 2: 0 | PART XX |
| DATA BLOCK 3 PROCESS 1: 1 PROCESS 2: 0 | PART 74 |

Figure 3E:
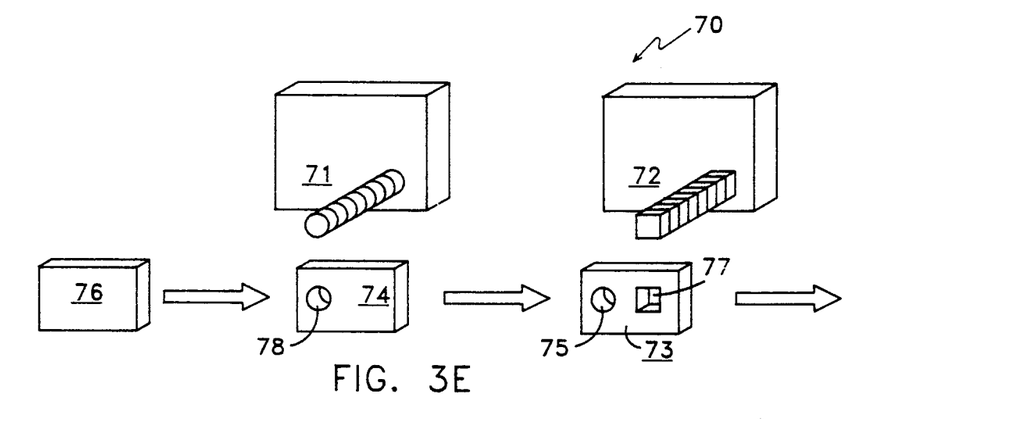
Figure 3F:
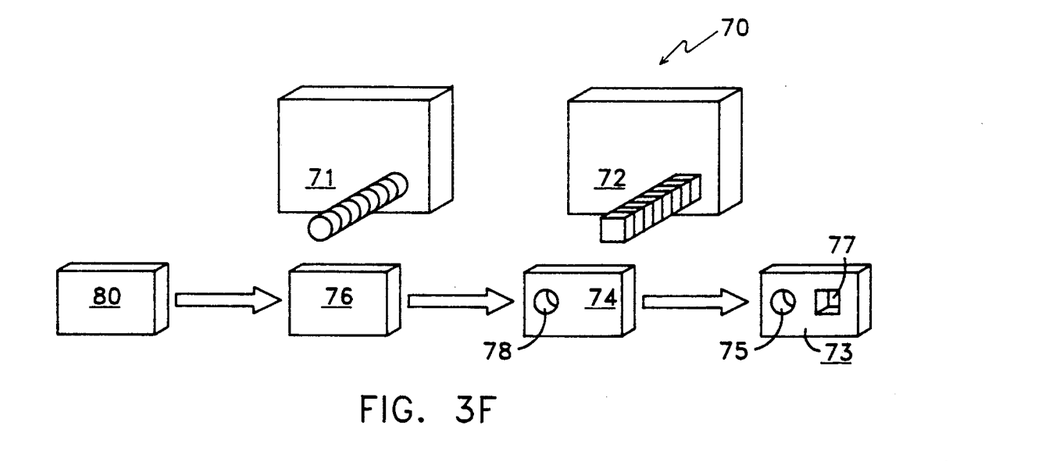

Once again, the line is indexed and the part transfer order of Table 3 is given. The system is then as illustrated in FIG. 3F and the part position index is as shown in Table 9.

TABLE 9

PART POSITION INDEX

| DATA BLOCK 1 | = | STATION X |
|---|---|---|
| DATA BLOCK 2 | = | STATION 1 |
| DATA BLOCK 3 | = | STATION 2 |

In comparing Table 9 with Table 2, it will be seen that the index has come full circle to its initial state. This happens at the same time part 73 has been completed and removed from line 70. Therefor, the index indicates that the record for workpiece 76 at station 1 is in data block 2 and the record for workpiece 74 at station 2 is in data block 3.

When a part is removed from the system, such as workpiece 73, the part position record for that data block is reset as shown in Table 10. It should be noted that by adding extra data blocks this information can be retained or the record can be down loaded into a database or printed out for later use.

TABLE 10

DATA BLOCKS

| DATA BLOCK 1 PROCESS 1: 0 PROCESS 2: 0 | PART XX |
|---|---|
| DATA BLOCK 2 PROCESS 1: 0 PROCESS 2: 0 | PART 76 |
| DATA BLOCK 3 PROCESS 1: 1 PROCESS 2: 0 | PART 74 |

In Table 10, the processes are cleared in data block 1 to prepare it for the next workpiece, workpiece 80, to enter line 70. Data block 2 contains the record of workpiece 76; and data block 3 contains the record of workpiece 74.

This process of transferring and cycling will continue until the system is stopped, as will the steps of updating the index and updating the data blocks.

It is important to note that the part processing record contained within the data blocks can contain as much information as desired. A particular embodiment of a part process record is set forth in Table 11.

TABLE 11
PART PROCESS RECORD

| DATA | BITS REQUIRED |
| --- | --- |
| REJECT | 1 |
| NO PART PRESENT | # OF POSITIONS |
| PART PRESENT | # OF POSITIONS |
| PROCESS STARTED | # OF PROCESSES |
| PROCESS DONE | # OF PROCESSES |
| PROCESS NOT REQUIRED | # OF PROCESSES |
| VARIABLE 1 | |
| VARIABLE 2 | |

The reject data only requires one bit since the part is either rejected or not rejected. If rejected, this bit can be used to inhibit cycling of down stream stations and cause the workpiece to be removed from the line when a removal station is encountered.

The part present and no part present data have a number of bits equal to the number of positions on a line. At each position, information is gathered as to whether the workpiece is present or not present. Since there are three possibilities (part present, no part present, and no sensor at that position) two bits are required for each position. Therefor, part present and no part present are both utilized.

The next section is that of process started, process finished, and no process required. These each have a number of bits equivalent to the number of processes to be performed. As the titles indicate, there are three bits of data for each process to indicate that it started, finished, or is not required.

The final group of data is labeled variables. This area can be used to keep track of any type of data in which the user may be interested. Such as how long did it take to drill a hole, how deep was the hole, etc.

As stated previously, every computer on a network has a logic module memory such as that represented by FIG. 2. With continuous real time updates of the data in the logic memories, every computer memory contains a full part process record (or data block) of every workpiece in the system. It will be appreciated by those of skill in the art that while the upstream stations do not need the process information from the down stream stations, it takes more programming and time to edit out such information than to accept the information.

Figure 4:
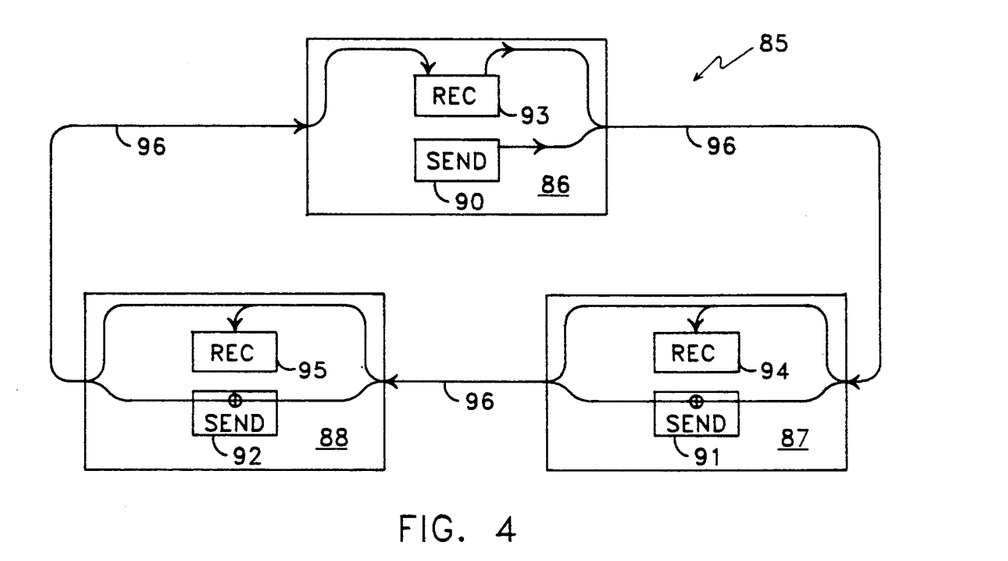
FIG. 4 is a block diagram of a communication network utilized by the present invention.
Figure 5A:
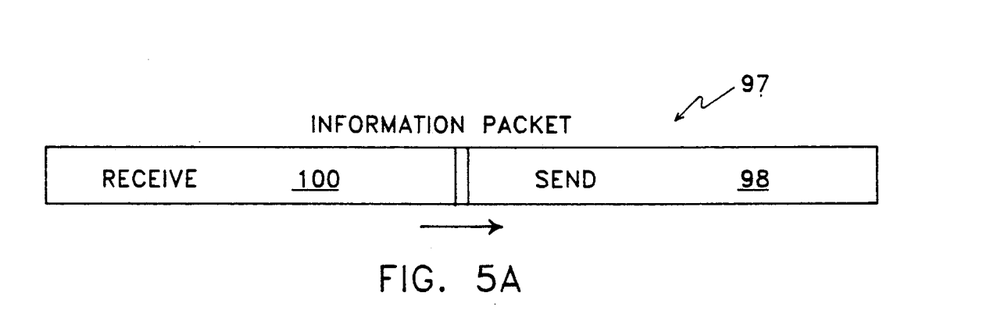
FIGS. 5A and 5B are block diagrams of information packets utilized the present invention.

The distribution of data around a network 85 is illustrated in FIG. 4. Network 85 consists of an orchestrator 86 and stations 87 and 88. Logic modules of stations 86, 87, and 88 are divided into send (90, 91, and 92) and receive (93, 94, and 95) portions, respectively. In this communications scheme, information is passed on a line 96 between stations 86, 87, and 88. The information is transmitted serially in time-division multiplexed information packets 97 such as illustrated in FIG. 5A. Packet 97 consists of a send portion 98 and a receive portion 100.

As information packet 97 is passed around network 85, data contained in send portions 90, 91, and 92 are logically ORed together. The send data originates in send portion 90. The data from portion 90 is then ORed with the information of send 91. The result is then ORed with send portion 92 and transmitted to receive portion 93 of orchestrator 86. It should be noted that the internal loop connections are not hard wired allowing any of the stations to take over the function of orchestrator as needed.

Receive portion 100 of packet 97 also originates at receive portion 93 of orchestrator 86 and is loaded into receive portions 94 and 95 before returning to 93.

Figure 5B:
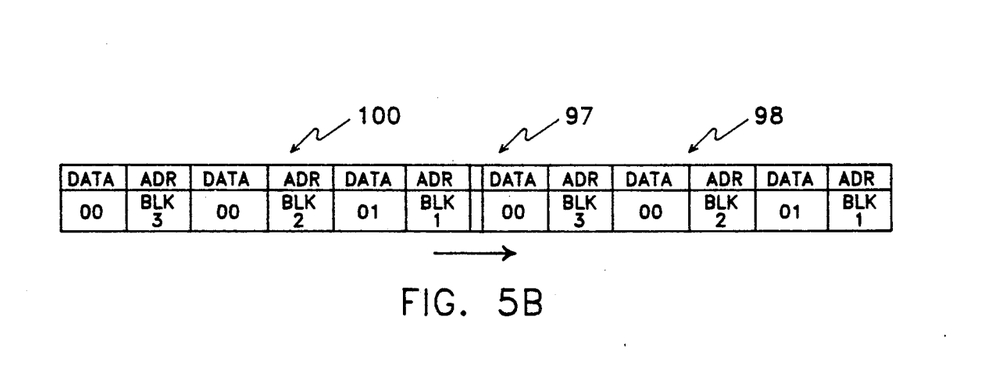

In one example, reference will be made to FIGS. 3D and 3E. Once in the condition illustrated in FIG. 3D, the information in data blocks 1, 2 and 3 of all the memories as shown in Table 8, are represented in information on line 96 of FIG. 5B. At this point, the send data, 01 of block 1, representing that process 1 has been completed, is sent from send portion 90 to send portion 91. In send portion 91, this is ORed with the information in data block 1 of station 87, which is also 01. This output 01 is then sent to station 88 where it is again ORed with 01 from data block 1. The result is then transmitted to receive portion 93 of orchestrator 86 where it is stored. The same thing is done for data blocks 2 and 3. It should be noted here that this type of communication is conducted in a serial fashion and that the system does not wait for transmission of data block 1 to be completed before continuing.

When it is time for receive portion 100 to be transmitted, the data is read out of receive portion 93 and down loaded into receive portions 94 and 95 before being returned to receive portion 93. Since no processing has been performed while the data stabilizes as in Table 8, the system will continuously read and write as set forth above.

Referring to FIG. 2, during the communication operation described, within each logic module, the send portion will see the address of data block 1 come through. The data for block 1 will be copied into send 66 and ORed with the information currently on the line for block 1. When the receive signal comes back, the address identifies the address of block 1. The data following the address is loaded into block 1 of file area 68. Once one send/receive cycle has been completed the data in data block 1 will be the same at all of the stations.

Figure 6A:
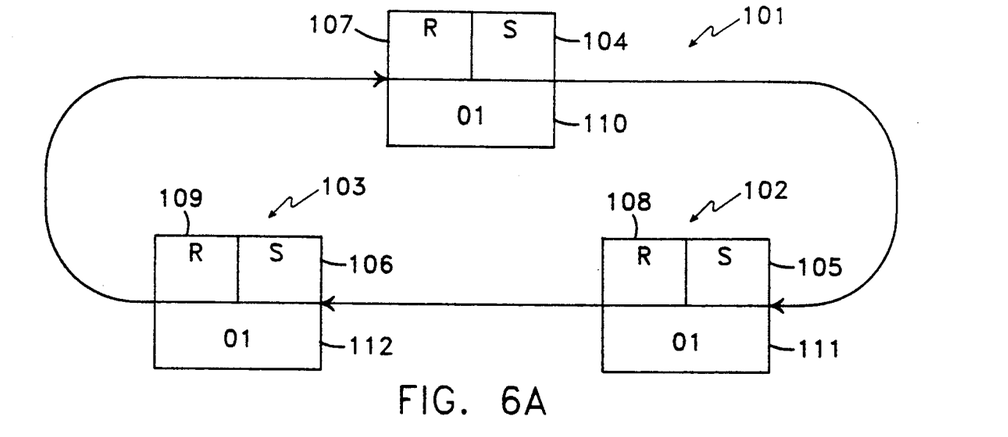
FIGS. 6A-6F are block diagrams of a communication network utilized by the present invention.

Referring now to FIGS. 6A-6F, a graphical representation of the communication process is provided. Three stations 101-103 are shown in FIG. 6A. For this example, station 101 will be used as the network orchestrator. Stations 101-103 contain send portions 104-106, receive portions 107-109, and file portions 110-112. In FIG. 6A, the system has reached equilibrium with a 01 stored in file portions 110-112. This represents that processing of this particular workpiece has been completed by station 102.

The station then indexes passing the workpiece to station 103. Station 103 then processes the workpiece and changes the data in file 112 from 01 to 11. This information then needs to be disseminated throughout network 85.

Figure 6B:
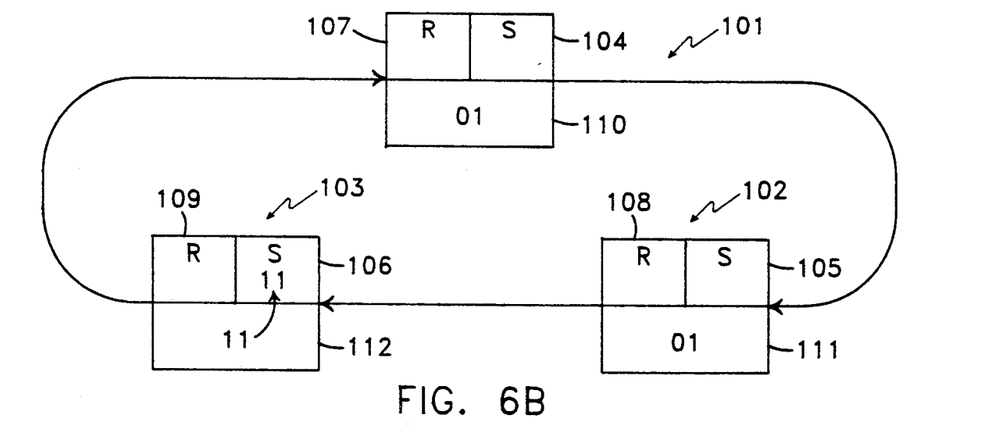
Figure 6C:
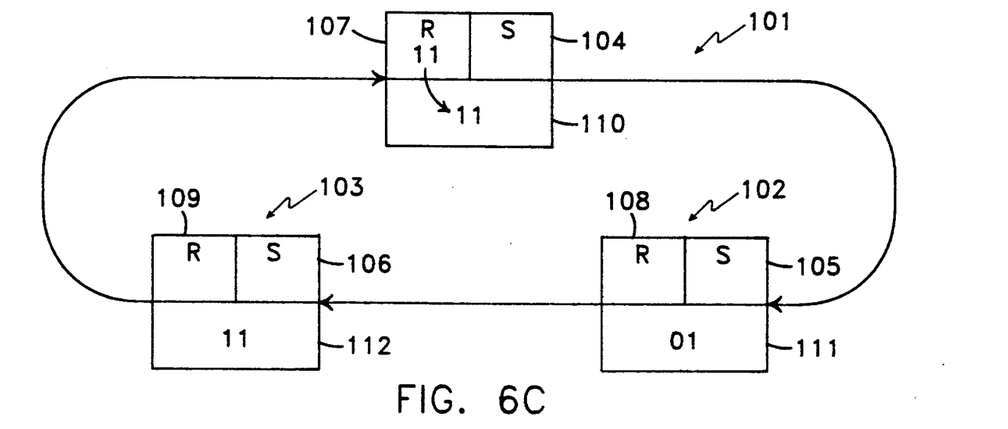

Starting with a send signal originating in station 101, the data 01 is loaded from file portion 110 into send portion 104 and transmitted to station 102. Station 102 then loads its data 01 from file portion 111 into send portion 105. The data are then ORed together to obtain a 01 data signal. This signal is then transmitted to station 103. Station 103 loads the 11 data from file portion 112 into send portion 106, FIG. 6B. This is then ORed with the 01 on the communication line to form a 11 data signal. This signal is then transmitted to receive portion 107 and loaded into file portion 110, FIG. 6C.

Figure 6D:
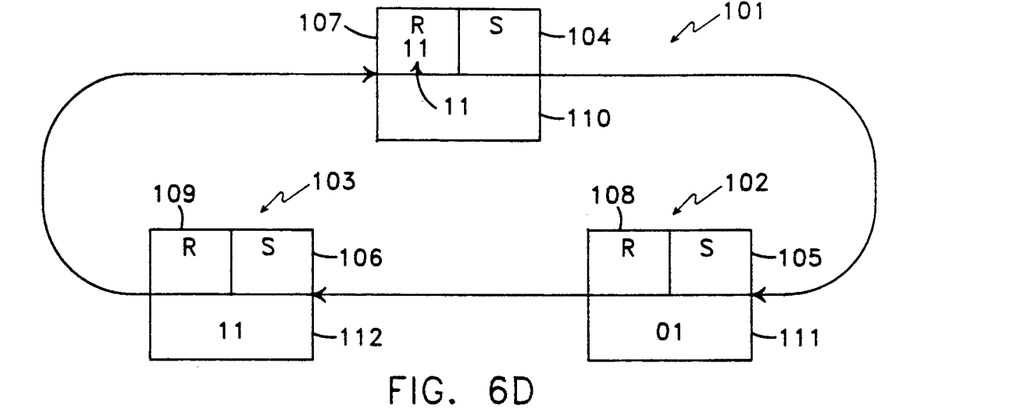
Figure 6E:
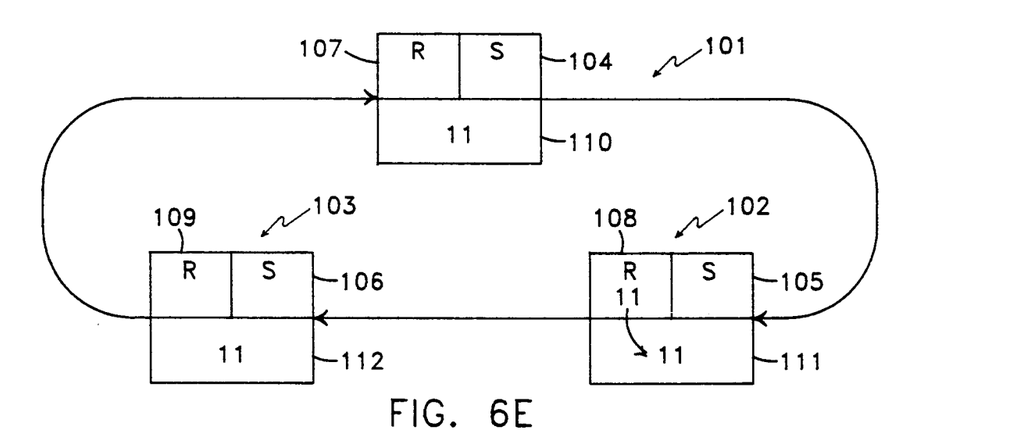
Figure 6F:
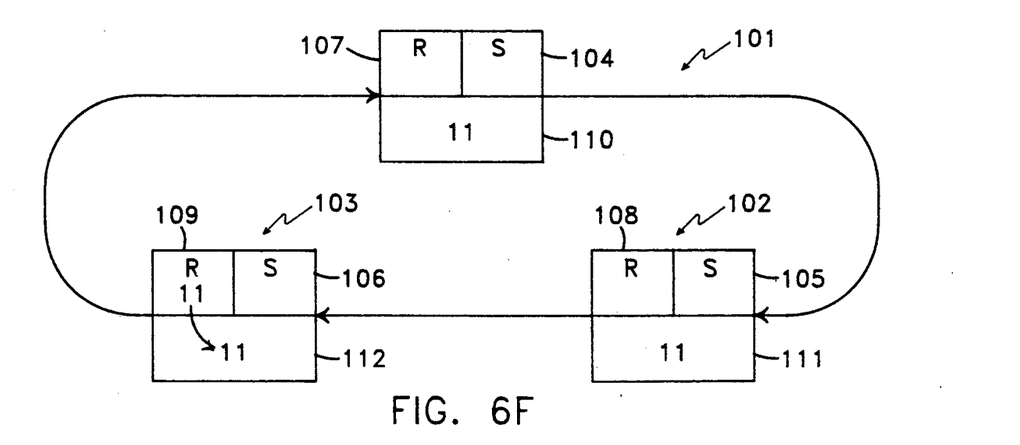

Next, receive portion 100 of information packet 97 is transmitted. The 11 data is loaded from file portion 110 to receive portion 107, FIG. 6D. This is then transmitted to station 102 and down loaded into receive portion 104 and from there to file portion 111, FIG. 6E. The signal from station 101 then continues on to station 103 where it is loaded into receive portion 109 and from there to file portion 112, FIG. 6F. The system has now been entirely updated and is again in equilibrium.

It should be understood that while this example has been described in a relatively simplistic manner, utilizing one data block, that a typical system will continually track and update hundreds of pieces of information that can easily translate into thousands of bits. However, even with all of this information passing around the system, the information can be updated at every station in a fraction of a second. One particular embodiment utilizes a fiber optic network capable of communicating at two million bits per second.

For further explanation of the communication network described above, reference is made to pending U.S. patent application having Ser. No. 757,225, field Jul. 19, 1985 by Rodger T. Lovrenich and Robin H. Leaf, now abandoned, which is incorporated herein by reference, the original specification of which has been carried forward into continuation-in-part application Ser. No. 335,338 filed Apr. 10, 1989.

The information contained in each part process record is utilized by the various stations to determine if the workpiece is ready to be processed. If the workpiece is not in condition for processing, the part process record acts as an inhibit, preventing the station from cycling.

Figure 7A:
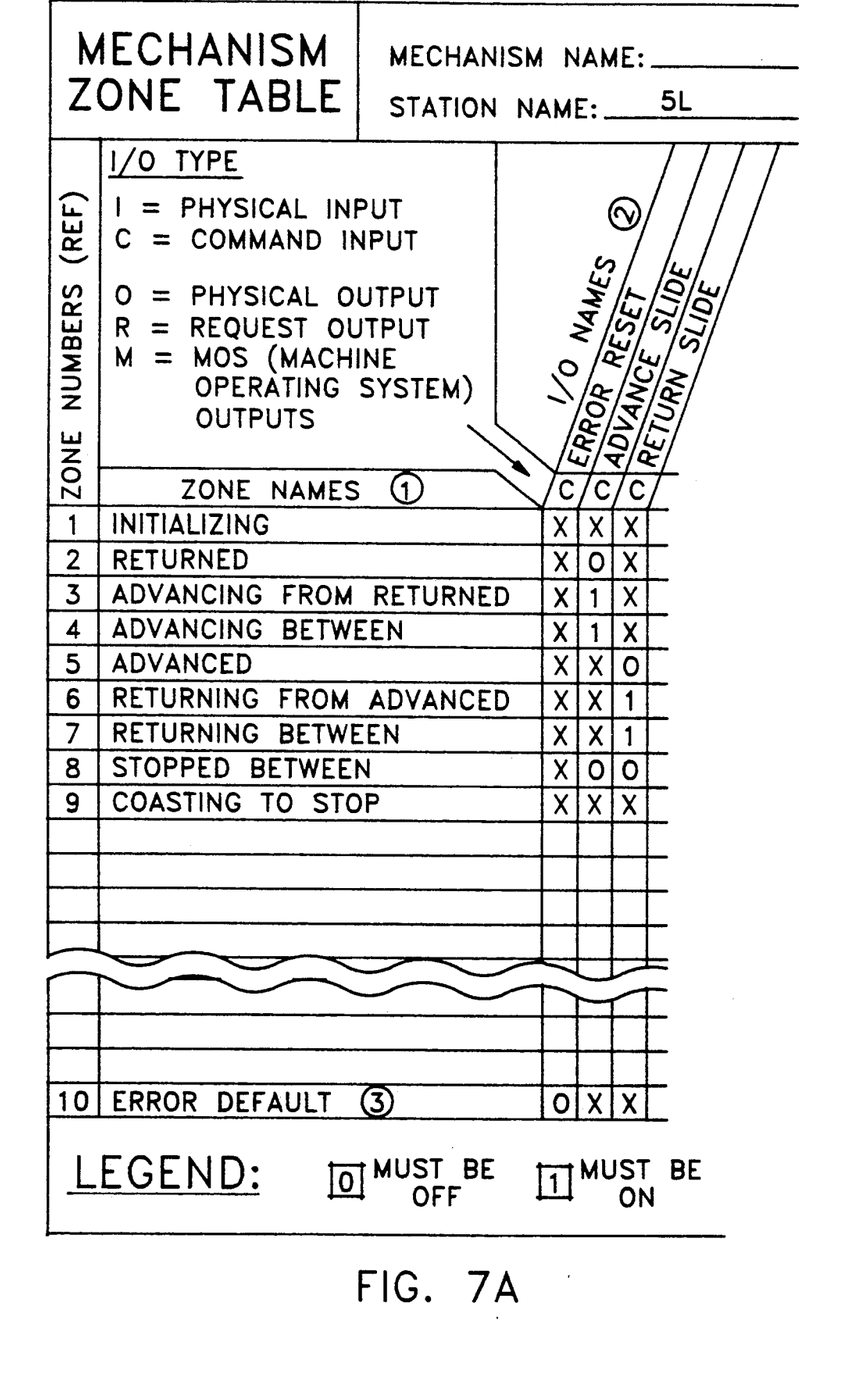
FIGS. 7A-7C are a graphical representation, in the form of a table, of a zone logic processing method.
Figure 7B:
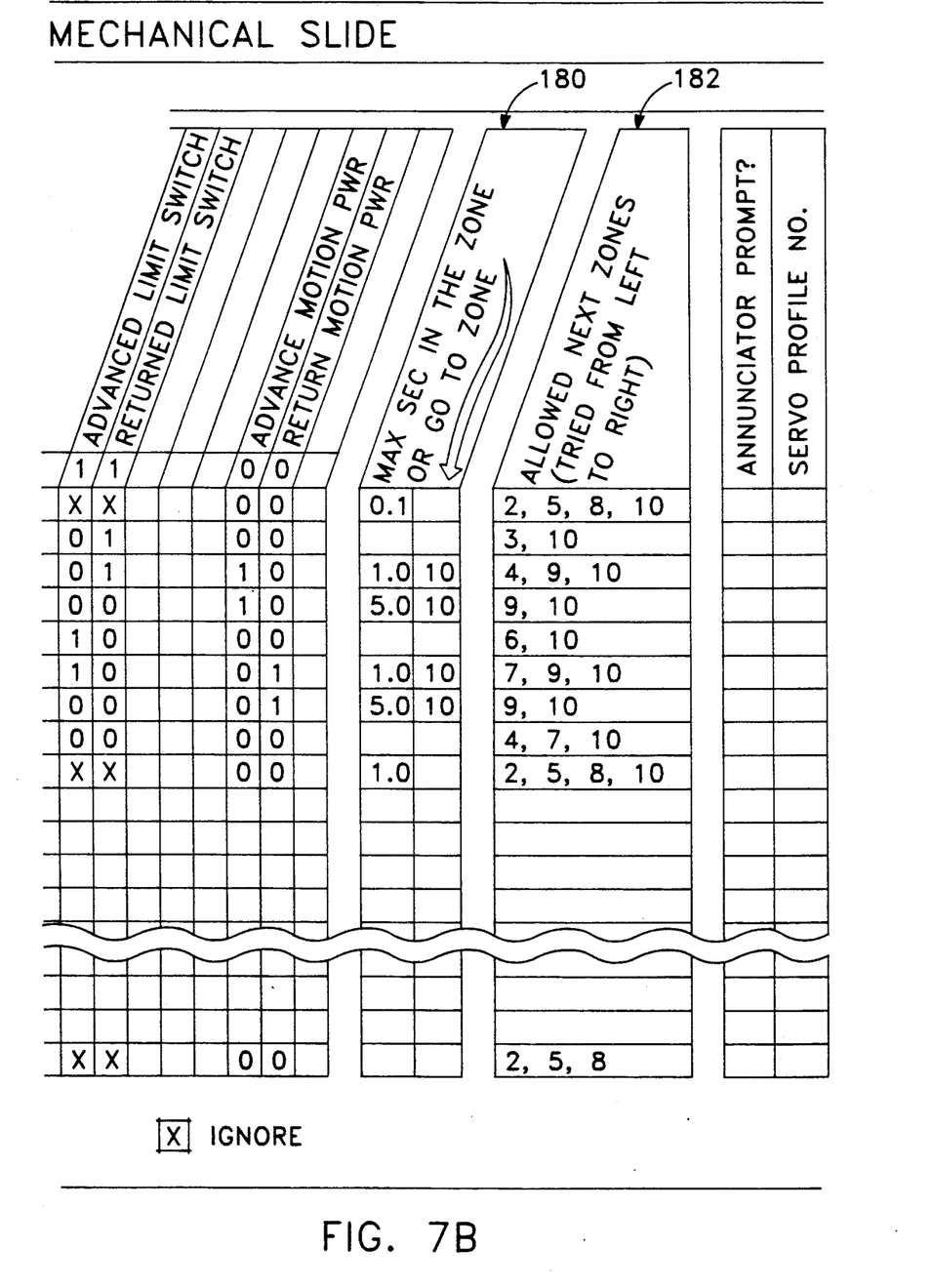
Figure 7C:
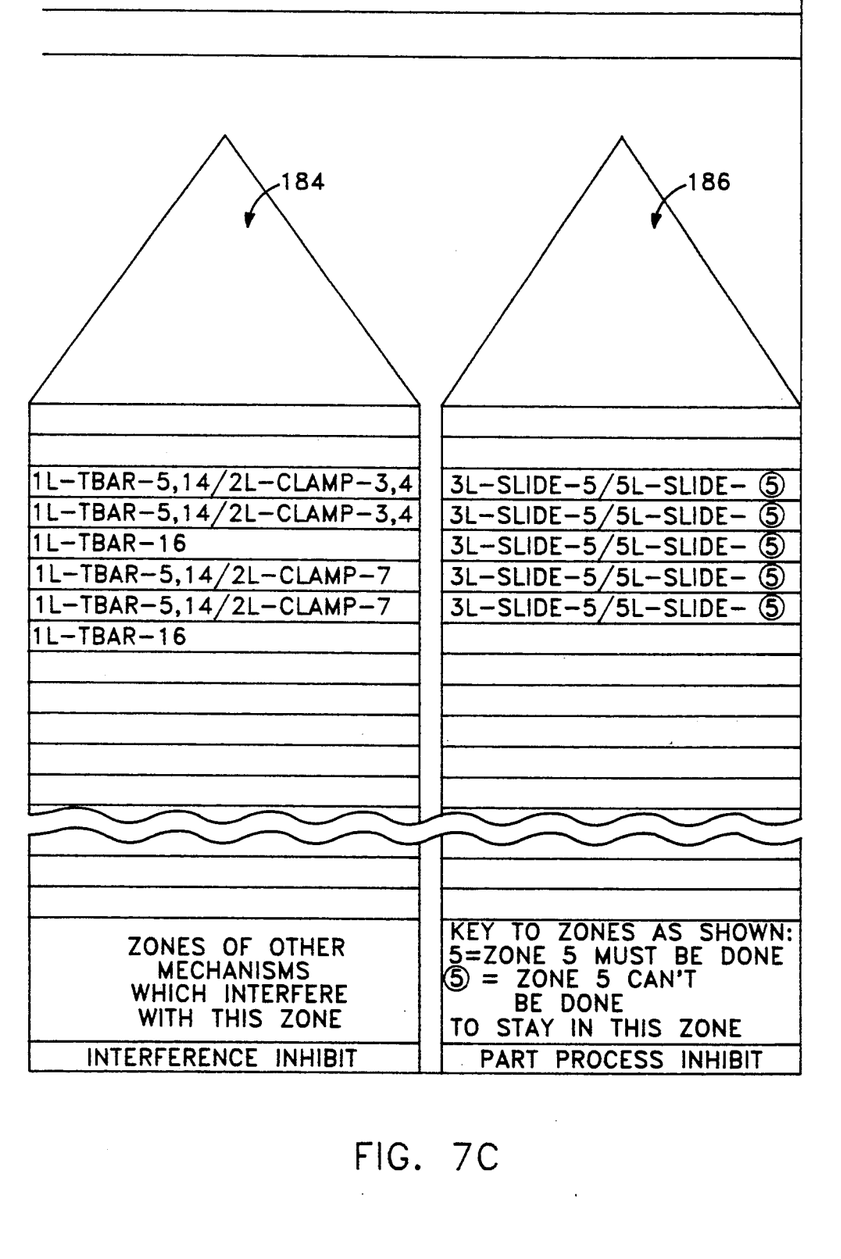

In FIG. 7, a graphical representation, in the form of a table, of a zone logic processing method is represented. This method operates as set forth in U.S. Pat. No. 4,858,102 which is incorporated herein by reference. The zone logic table of FIG. 7 is a type of work sheet utilized to obtain the information needed to program a line equipped with the appropriate processing hardware. An example of a portion of that hardware is described in U.S. Pat. Nos. 4,621,200 and 4,705,900 both invented by Rodger T. Lovrenich.

The table of FIG. 7A-7C is for one particular mechanism, mechanical slide, of a station designated 5L. Here a list of zone names and input/output names are organized in the table with a listing of the states of the inputs and outputs for each zone. In column 180 of the zone table, the maximum time in the zones, if there is a maximum time, are set forth. If this maximum time is exceeded, the zone logic system moves to the next zone listed in column 180, in this example zone 10, the error zone.

Column 182 lists the allowed next zones, or the zones from which the current zone is permitted to pass. A change in either an input or output state can cause a change to another zone. The new zone is determined by comparing the new states of the inputs/outputs with the inputs/outputs in the table to find a match; rather than requiring that all potential zones be listed and having the system conduct a search through all of these zones. A concept of zone logic lists the allowed next zones from which each valid zone is allowed to pass. This greatly reduces the amount of information that needs to be entered and greatly speeds up the operation of the mechanisms.

As an example, if the mechanism is currently operating in zone 3 (Advancing From Returned) the allowed next zones are zones 4 (Advancing Between), 9 (Coasting to Stop), and 10 (Error). If the input/output configuration changes, the system first checks the I/O image of zone 3 for a match. If zone 3 does not match zone 4 is checked. If zone 4 does match the system will move to zone 10, the error zone.

In column 184 of FIG. 7C, a list of zones of other mechanisms which have zones that interfere with a particular zone of this mechanism are listed. If another mechanism is in an interfering zone, the cycling of this mechanism will be inhibited.

In column 186 of FIG. 7C, a part process inhibit is presented. This portion of zone logic will inhibit cycling of the mechanism if some data contained within the part processing record for the current workpiece is improper. For example, the workpiece may have been tagged as a rejected part, Table 11. If the system is set to inhibit cycling if the rejected part bit is set, the mechanism will be inhibited from operating. Another example is that for every process started, there must be a corresponding process done, otherwise cycling will be inhibited.

Because of the unlimited information which can be inserted in the part processing record, the station can be programmed to inhibit processing for any number of reasons.

Thus, it will be apparent, upon reviewing this specification, to one skilled in the art that there has been provided in accordance with the invention, a method and apparatus that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method for manufacturing a workpiece in a manufacturing machine having a plurality of stations each of which has a means for storing data, comprising the steps of:

storing in each local station's storage means a part processing record containing,
status data of the part at that local station and status data of parts at any other station which could subsequently arrive at that local station and
a part position index locating each part relative to a particular station of the machine, cycling said plurality of stations by performing the operations indicated by the part status data;

updating said part status of said process record corresponding to said workpiece located at a station;

distributing to said means for storing at each local station a concurrent updated part process record of any part at any other station which could subsequently arrive at the local station;

transferring said workpiece to a next station of said plurality of stations; and adjusting said part position index to reflect the movement of the workpieces.

2. The method of claim 1 further comprising the step of:

using the part processing record to inhibit an operation.

3. The method of claim 1 further comprising the step of:

changing the part position index in accordance with a part transfer order which reflects the movement of the parts.

4. The method of claim 1 further comprising the step of:
providing data indicative of a location for which no part is present.

5. The method of claim 1 further comprising the step of:
providing data indicative of a part reject condition.

6. The method of claim 1 further comprising the step of:
providing data indicative of process that is not required for said part.

7. The method of claim 1 further comprising the step of:
initializing the status data for a part in the machine to a partially completed status of the part to reflect any previously completed processes.

8. The method of claim further comprising the step of:
initializing that status data for a part in the machine to reflect any processes not required for the part.

9. The method of claim 1 or 3 further comprising the step of:
replicating the complete part processing record throughout the distributed memory means.

10. The method of claim 9 further comprising the steps of:
a) the replicating step includes copying the current status data of each part to an orchestrator which then distributes the complete status data to each local station memory means, and
b) updating the part position indices of each local station memory means.

11. A machine which concurrently operates on a plurality of parts at a plurality of stations, each part being sequenced for operation by at least two stations of the machine comprising:
a distributed memory means storing in combination a part processing record comprising
a) data indicative of every part in the machine and their respective location, and
b) status data for each part in the machine indicative of the process already completed and the processes requiring completion,
c) at least one of the memory means of a local station storing at least its own part status data and the status data of parts at any other station which could subsequently arrive at the local station, and
means or maintaining concurrency of parts status data at all local memory means where status data is stored.

12. The machine of claim 11 wherein the memory means further comprises:
means for using the part processing record to inhibit an operation.

13. The machine of claim 1 wherein:
a) the data indicative of the location of each part is a part position index, and
b) means for changing the part position index in correspondence with the movement of parts between stations.

14. The machine of claim 11 wherein the memory means further comprises:
data indicative of a location for which no part is present.

15. The machine of claim 11 wherein the status data further comprises:
an indication of a part reject condition.

16. The machine of claim 11 wherein the status data further comprises:
an indication of a process that is not required for said part.

17. The machine of claim 11 further comprising:
the status data for a part in the machine being initialized to a partially completed status of the part to reflect any previously completed processes.

18. The machine of claim 11 further comprising:
that status data for a part in the machine being initialized to reflect any processes not required for the part.

19. The machine of claim 13 further comprising:
the part position index being changed in accordance with a part transfer order which reflects the movement of the parts.

20. The machine of claim 11 or 19 further comprising:
means for replicating the complete part processing record through the distributed memory means.

21. The machine of claim 20 further comprising:
a) the replicating means including means for copying the current status data of each part to an orchestrator which then distributes the complete status data to each local station memory means, and
b) means for updating the part position indices of each local station memory means.

22. In a machine which concurrently operates on a plurality of parts at a plurality of stations, each part being transferred for an operation by at least two stations of the machine, an improved system for tracking the operations performed on each part in the machine comprising:
a distributed memory storing in aggregate a complete part process record of every part in the machine having at each station a memory comprising
a plurality of data blocks in which is stored a processing record of the part at the station and of any part at any other station which could arrive at the station, and
a part position index in which is stored the identification of the station at which each part in the machine is located,
the memory correlating for each part its respective data block and station identification,
a processor for updating in each memory where the processing record is stored the respective data blocks as operations are performed on each part, and
a processor for updating the part position index in each memory where the part position index is stored as parts are transferred through the machine,
whereby each part and the operations performed thereon are tracked through the machine.

* * * * *